(12) United States Patent
Stojanovski (10) Patent No.: US 12,068,504 B2
(45) Date of Patent: Aug. 20, 2024

(54) BATTERY SYSTEMS, METHODS, AND VEHICLES WITH INTERCONNECT BOARD ASSEMBLIES HAVING MULTILAYER CURRENT COLLECTORS

(71) Applicant: GM GLOBAL TECHNOLOGY OPERATIONS LLC, Detroit, MI (US)

(72) Inventor: Mitchell Stojanovski, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 72 days.

(21) Appl. No.: 17/833,226

(22) Filed: Jun. 6, 2022

(65) Prior Publication Data

US 2023/0395947 A1 Dec. 7, 2023

(51) Int. Cl.
| | |
|---|---|
| *H01M 50/507* | (2021.01) |
| *H01M 10/04* | (2006.01) |
| *H01M 50/514* | (2021.01) |
| *H01M 50/533* | (2021.01) |
| *H01M 50/536* | (2021.01) |
| *H01M 50/54* | (2021.01) |

(52) U.S. Cl.
CPC ..... *H01M 50/507* (2021.01); *H01M 10/0413* (2013.01); *H01M 50/514* (2021.01); *H01M 50/533* (2021.01); *H01M 50/536* (2021.01); *H01M 50/54* (2021.01); *H01M 2220/20* (2013.01)

(58) Field of Classification Search
CPC ............ H01M 50/507; H01M 50/514; H01M 50/533; H01M 50/536; H01M 50/54; H01M 50/502; H01M 10/0413; H01M 10/04

See application file for complete search history.

(56) References Cited

U.S. PATENT DOCUMENTS

| | | |
|---|---|---|
| 6,641,942 B1 | 11/2003 | Rouillard et al. |
| 7,109,685 B2 | 9/2006 | Tate, Jr. et al. |
| 7,324,902 B2 | 1/2008 | Verbrugge et al. |
| 7,928,690 B2 | 4/2011 | Koch et al. |
| 8,035,986 B2 | 10/2011 | Koetting et al. |
| 9,178,192 B2 | 11/2015 | Payne |

(Continued)

*Primary Examiner* — Matthew T Martin
*Assistant Examiner* — Adam J Francis
(74) *Attorney, Agent, or Firm* — Quinn IP Law (57) ABSTRACT

Presented are electrical interconnect board (ICB) assemblies with multilayer current collectors, methods for making/using such ICB assemblies, battery systems employing such ICB assemblies, and vehicles equipped with such ICB assemblies. An ICB assembly includes an electrically insulative ICB board frame that mounts to a battery case, an electrically conductive busbar assembly mounted to the board frame, and one or more end terminal assemblies mounted to the board frame adjacent opposing ends of the busbar assembly. The busbar assembly includes one or more busbar tracks that electrically interconnect a group of battery cells. Each end terminal assembly includes a bottom current collector plate that attaches to the ICB board frame and electrically connects to the battery cells and busbar track, a dielectric separator attached to the bottom current collector plate, and a top current collector plate attached to the dielectric separator and electrically connected to the bottom current collector plate.

20 Claims, 4 Drawing Sheets

(56) References Cited

U.S. PATENT DOCUMENTS

| | | |
|---|---|---|
| 9,354,277 B2 | 5/2016 | Lin et al. |
| 9,461,490 B2 | 10/2016 | Ying |
| 9,487,872 B2 | 11/2016 | Kelly et al. |
| 10,411,306 B2 | 9/2019 | Kim et al. |
| 10,971,714 B2 | 4/2021 | Tallman et al. |
| 11,302,996 B2 | 4/2022 | Castillo et al. |
| 2011/0309838 A1 | 12/2011 | Lin et al. |
| 2015/0017508 A1 | 1/2015 | Khakhalev |
| 2015/0162571 A1 | 6/2015 | Ogg et al. |
| 2016/0254562 A1 | 9/2016 | Morris-Cohen et al. |
| 2016/0259011 A1 | 9/2016 | Joe |
| 2016/0293991 A1 | 10/2016 | Goeltz et al. |
| 2016/0336552 A1 | 11/2016 | MacLean et al. |
| 2016/0372777 A1 | 12/2016 | Buckley et al. |
| 2017/0077507 A1 | 3/2017 | Harada et al. |
| 2018/0190960 A1* | 7/2018 | Harris ................. H01M 10/613 |
| 2018/0375132 A1 | 12/2018 | Li et al. |
| 2019/0126770 A1 | 5/2019 | Koch et al. |
| 2020/0259153 A1* | 8/2020 | Capati ................. H01M 50/213 |
| 2022/0173484 A1* | 6/2022 | Kwon ................. H01M 10/486 |
| 2022/0231381 A1* | 7/2022 | Ford ................... H01M 50/213 |

\* cited by examiner

BATTERY SYSTEMS, METHODS, AND VEHICLES WITH INTERCONNECT BOARD ASSEMBLIES HAVING MULTILAYER CURRENT COLLECTORS

INTRODUCTION

The present disclosure relates generally to electrical energy storage systems. More specifically, aspects of this disclosure relate to rechargeable battery systems with electrical interconnect boards for electrically connecting cylindrical battery cells.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between each traction motor and the rechargeable energy storage system that supplies the requisite power for operating many hybrid-electric and full-electric powertrains. For battery-electric vehicles (BEV), the RESS is generally composed of one or more high-energy density, high-capacity traction battery packs that stack or cluster battery cells into a shared pack housing or into individual battery modules. Located on a battery side of the HV electrical system is a front-end DC-to-DC power converter that is connected to the traction battery pack(s) in order to increase the supply of voltage to a main DC bus and a DC-to-AC power inverter module (PIM). The traction PIM is an electronic switching device for converting the DC output of the battery pack(s) into an alternating current (AC) input for powering the multi-phase traction motor(s) using, for example, pulse width modulated (PWM) control signals. A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

There are four primary types of batteries that are used in electric-drive vehicles: lithium-class batteries, nickel-metal hydride batteries, ultracapacitor batteries, and lead-acid batteries. As per lithium-class designs, lithium-metal and lithium-ion (secondary) batteries make up the bulk of commercial lithium battery (LiB) configurations in automotive applications due to their enhanced stability, energy density, and rechargeable capabilities. A standard lithium-ion cell is generally composed of an electrolyte material, at least one pair of working electrodes, and a permeable separator, all of which are enclosed inside an electrically insulated packaging, such as a cell pouch, cylindrical can, or prismatic shell. One electrode serves as a positive ("cathode") electrode and the other electrode serves as a negative ("anode") electrode during cell discharge. Rechargeable Li-ion batteries operate by reversibly passing lithium ions back and forth through the separator and between the negative and positive electrodes. Grouped battery cells may be connected in series or parallel through use of an electrical interconnect board (ICB). The ICB assembly is oftentimes integrated into the pack housing or battery module and contains the electrical buses, sensing hardware, and power electronics for operating the battery module/pack.

SUMMARY

Presented herein are electrical interconnect board assemblies with multilayer current collectors, methods for manufacturing and methods for operating such ICB assemblies, battery systems employing such ICB assemblies, and motor vehicles equipped with such ICB assemblies. By way of example, there are disclosed battery cell ICBs with multilayer current collector stacks. The ICB assembly utilizes an electrically insulating board frame for mounting thereon two (or more) parallel busbar tracks that electrically interconnect a cluster of lithium-class cylindrical battery cells. These busbar tracks may be arranged in a U-shaped current flow configuration with a distinct cap end terminal plate at a distal end of each track and a shared connector end terminal plate connecting proximal ends of the two tracks. A terminal cover ("first current collector plate") is stacked onto each end terminal plate ("second current collector plate") with a dielectric separator layer inserted between each terminal cover and the busbar. The three end terminals may be structurally distinct from one another (e.g., each having a distinct shape, size, and/or arrangement of cutouts). In the same vein, the three terminal covers may be structurally distinct from one another, and the dielectric separator layers may be structurally distinct from one another. The ICB board frame may be molded as a single-piece structure from a polymeric material, whereas the end terminals and terminal covers may each be a distinct single-piece structure that is stamped from an electrically conductive material (e.g., copper, aluminum, nickel, etc.). Each dielectric layer may be cut from a polyamide, a polyester, a ceramic, etc., as a one-piece construction. Each multilayer current collector stack may be mounted to the ICB board frame by mechanical fasteners, heat stakes, adhesive, over-molding, etc.

Attendant benefits for at least some of the disclosed concepts include novel battery systems with a combined single-piece and two-piece multilayered battery cell interconnect solution that may be adapted and scaled to various electrical architectures. Disclosed battery cell ICB assemblies with multilayer current collectors help to minimize the total contribution to Z-height and, thus, reduce packaging space requirements. Other attendant benefits may include ICB assemblies that enable fast and simplified locating of current collectors for welding to cells while insulating adjacent current collector groups from the cells above and/or below. Disclosed features may be used to simplify and expedite mating of the ICB with the cells and the senseline assembly.

Aspects of this disclosure are directed to battery systems, including battery modules and traction battery packs, for storing and supplying electrical energy. In an example, a battery system ICB assembly includes an electrically insulative ICB board frame, an electrically conductive busbar assembly mounted to the ICB board frame, and one or more end terminal assemblies mounted to the ICB board frame adjacent opposing ends of the busbar assembly. The busbar assembly includes one or more busbar tracks that electrically interconnect a group of battery cells. Each end terminal assembly includes a bottom (first) current collector layer that attaches to the ICB board frame and electrically connects to the battery cells and busbar track. A central (first) dielectric layer is adjacent to the bottom current collector layer, and a top (second) current collector layer is attached to the dielectric layer and electrically connected to the bottom current collector layer.

Additional aspects of this disclosure are directed to motor vehicles equipped with traction battery packs employing battery cell ICB assemblies with multilayer current collector stacks. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, e-bikes, e-scooters, watercraft, aircraft, etc. For non-automotive applications, disclosed concepts may be implemented for any logically relevant use, including stand-alone power stations and portable power packs, photovoltaic systems, handheld electronic devices, pumping equipment, machine tools, appliances, etc. While not per se limited, disclosed concepts may be particularly advantageous for use in battery modules with lithium-class cylindrical "can" cells.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s).

Continuing with the discussion of the preceding example, the traction battery pack contains a cluster of lithium-class cylindrical battery cells, e.g., staggered in parallel rows within a shared pack housing or one or more individual battery modules. The cylindrical battery cells are housed inside a pack/module case and electrically interconnected with one another via an ICB assembly mounted to the pack/module case. The ICB assembly includes an electrically insulative ICB board frame, an electrically conductive busbar assembly mounted to the ICB board frame, and multiple end terminal assemblies mounted to the ICB board frame adjacent opposing ends of the busbar assembly. The busbar assembly includes a pair of mutually parallel busbar tracks that electrically interconnect the cylindrical battery cells. Each end terminal assembly includes: a bottom current collector plate that is attached to the ICB board frame, spaced from the busbar assembly, electrically connected to the battery cells, and electrically connecting the busbar tracks; a dielectric separator sheet mounted adjacent the bottom current collector plate and over a select portion of the busbar track; and a top current collector plate mounted on the dielectric separator sheet and electrically connected to the bottom current collector plate.

Aspects of this disclosure are also directed to battery manufacturing systems, system control logic, and computer-readable media (CRM) for making and/or using any of the disclosed ICB assemblies, battery systems, and vehicles. In an example, a method is presented for assembling an interconnect board assembly for a battery system with multiple battery cells. This representative method includes, in any order and in any combination with any of the above and below disclosed options and features: receiving an ICB board frame; mounting a busbar assembly to the ICB board frame, the busbar assembly including an electrically conductive busbar track configured to electrically interconnect the battery cells; and mounting a first end terminal assembly to the ICB board frame adjacent a first end of the busbar assembly, the first end terminal assembly including: a first current collector layer attached to the ICB board frame and configured to electrically connect to the battery cells and the busbar track; a first dielectric layer adjacent the first current collector layer; and a second current collector layer attached to the first dielectric layer and electrically connected to the first current collector layer.

For any of the disclosed assemblies, methods, and vehicles, the bottom current collector layer of each end terminal assembly may include multiple collector tabs that project therefrom and contact predetermined (first) electrical terminals of the battery cells and, via this battery cell contact, electrically connect to the busbar track. In this instance, the bottom current collector layer may define therethrough multiple (first) cutout segments that each frames a respective one of these collector tabs. Similarly, the top (second) current collector layer may define therethrough multiple (second) cutout segments, each of which aligns with and exposes therethrough a respective first cutout segment and a respective collector tab. As a further option, the busbar track may include multiple track tabs that project from one end of the busbar assembly and contacts predetermined (second) electrical terminals of the battery cells. Each aligned pair of cutout segments of mating current collector layers may align with and expose therethrough a respective track tab and a respective collector tab.

For any of the disclosed assemblies, methods, and vehicles, the ICB assembly may include a second and a third end terminal assembly, both of which are mounted to the board frame adjacent an end of the busbar assembly opposite that of the first end terminal assembly. The second and third end terminal assemblies each includes: a bottom (third or fifth) current collector layer attached to the board frame and configured to electrically connect to the battery cells and busbar track; a central (second or third) dielectric layer adjacent the bottom (third) current collector layer; and a top (fourth or sixth) current collector layer attached to the dielectric layer and electrically connected to the bottom current collector layer. It may be desirable that each current collector layer be structurally distinct in shape, size, cutout arrangement, etc., from all other current collector layers. In the same vein, it may be desirable that each dielectric layer be structurally distinct in shape, size, cutout arrangement, etc., from all other dielectric layers.

For any of the disclosed assemblies, methods, and vehicles, each end terminal assembly may consist essentially of two current collector layers and a dielectric layer stacked with the dielectric layer interposed between and physically contacting the top current collector and the busbar track. As another option, the bottom current collector layer may be formed, in whole or in part, from a first electrically conductive material as a first single-piece planar plate. Likewise, the top current collector layer may be formed as a second single-piece planar plate using a second electrically conductive material, which may be the same as or different from the first electrically conductive material. Moreover, the dielectric layer may be formed, in whole or in part, from an electrically non-conductive material as a one-piece planar sheet.

For any of the disclosed assemblies, methods, and vehicles, the ICB board frame may be formed, in whole or in part, from an electrically insulative material as a one-piece planar panel. As another option, the electrically conductive busbar assembly may include a first busbar track with a first set of mutually parallel busbar rails, and a second busbar track with a second set of mutually parallel busbar rails. The first busbar track may be substantially parallel to the second busbar track, whereas the first set of mutually parallel busbar rails may be staggered with the second set of mutually parallel busbar rails.

The above Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Figure 1:
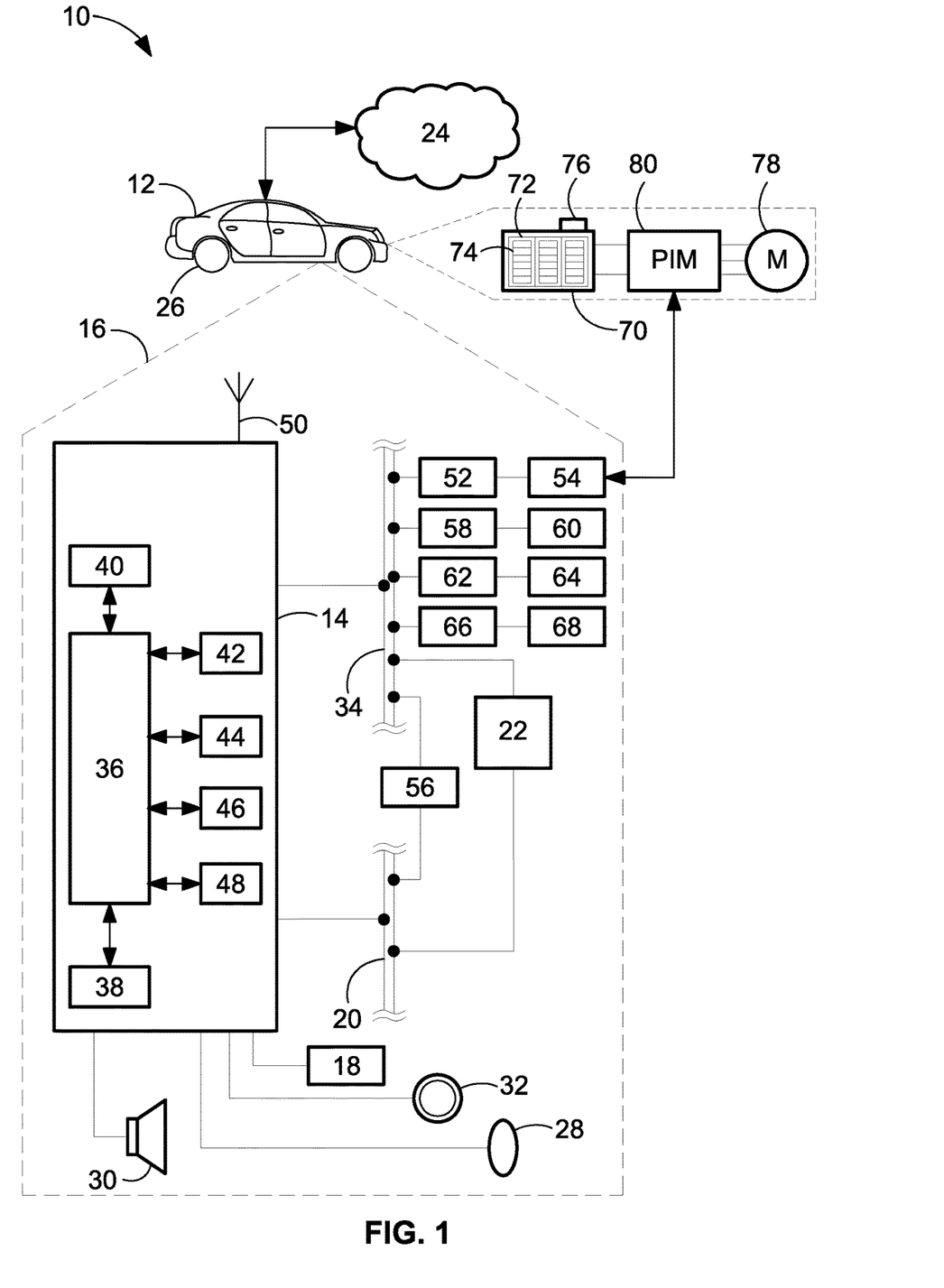
FIG. 1 is a partially schematic, side-view illustration of a representative motor vehicle with an electrified powertrain and a rechargeable energy storage system employing a traction battery pack in accordance with aspects of the disclosed concepts.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles, battery systems, and ICBs are shown and described in additional detail herein. Nevertheless, the vehicles, systems and assemblies discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, for example, a video display device 18, a microphone 28, audio speakers 30, and assorted user input controls 32 (e.g., buttons, knobs, switches, touchpads, joysticks, touchscreens, etc.). Microphone 28 provides a vehicle occupant with means to input verbal or other auditory commands; the vehicle 10 may be equipped with an embedded voice-processing unit utilizing audio filtering, editing, and analysis modules. Vehicle speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems and subsystems both onboard and off-board the vehicle body 12. This allows the vehicle 10 to perform assorted vehicle functions, such as modulating powertrain output, governing operation of the vehicle's transmission, activating the friction and regenerative brake systems, controlling vehicle steering, regulating charge and discharge of the vehicle's battery pack(s), and other automated functions. For instance, telematics unit 14 receives and transmits signals and data to/from a Powertrain Control Module (PCM) 52, an Advanced Driver Assistance System (ADAS) module 54, an Electronic Battery Control Module (EBCM) 56, a Steering Control Module (SCM) 58, and assorted other vehicle ECUs 60, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Wireless long-range communication (LRC) capabilities with remote, off-board devices may be provided via one or more of a cellular chipset/component, a navigation and location chipset/component (e.g., global positioning system (GPS) transceiver), or a wireless modem, all of which are collectively represented at 44 in FIG. 1. Wireless short-range communication (SRC) connectivity may be provided via a short-range wireless communications device 46 (e.g., a BLUETOOTH® unit, radio frequency identification (RFID) tag/reader, or near field communications (NFC) transceiver, etc.), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform, e.g., for achieving a desired level of autonomous vehicle operation.

To propel the motor vehicle 10, an electrified powertrain is operable to generate and deliver tractive torque to one or more of the vehicle's drive wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 may be generally composed of one or more battery modules 72, each of which contains a group of battery cells 74, such as lithium ion, lithium polymer, lithium metal, or nickel metal hydride battery cells of the pouch, can, or prismatic type. One or more electric machines, such as traction motor/generator (M) units 78, draw electrical power from and, optionally, deliver electrical power to the battery pack 70. A power inverter module (PIM) 80 electrically connects the battery pack(s) 70 to the motor/generator unit(s) 78 and modulates the transfer of electrical current therebetween. Disclosed concepts are similarly applicable to HEV and ICE-based powertrains, as well as RESS architectures employing EVB's with a shared pack housing.

The RESS may be a deep-cycle, high-ampere capacity battery system rated for approximately 350 to 800 VDC or more, for example, depending on a desired vehicle range, gross vehicle weight, and power ratings of the various accessory loads drawing from the RESS. To this end, the traction battery pack 70 may incorporate an aggregation of discrete electrochemical cells (e.g., 100's-1000's of cells) connected in series and/or parallel to achieve desired voltage, power capacity, and power density requirements. The battery modules 72 may be arranged in a pattern of rows and columns, and buttressed on a pack support plate (not shown) that provides subjacent support for the modules during vehicle operation. Aspects of the disclosed concepts may be similarly applicable to other electric storage unit architectures, including those employing nickel metal hydride (NiMH) batteries, lead acid batteries, zinc manganese batteries, organosilicon batteries, or other available or hereafter developed type of rechargeable electric vehicle battery (EVB).

The battery pack 70 may be configured such that module management, cell sensing, and module-to-module or module-to-host communication functionality is integrated directly into each battery module 72 and performed wired or wirelessly via an on-pack cell monitoring unit (CMU) 76. The CMU 76 may be a wireless-enabled, microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

Discussed below are battery cell interconnect board (ICB) assemblies fabricated with multilayer current collector stacks for electrically interconnecting a group of battery cells, such as the lithium class battery cells 74 of FIG. 1, of a battery system, such as RESS battery pack 70. For at least some implementations, these multilayer current collector solutions increase the conductor cross-sections of the ICB's busbar-connecting end terminals; doing so may help to decrease electrical resistance and heat generation without a marked increase in gross weight or size (Z-height) of the system. Incorporation of stacked electrical bussing end terminals may further enable simplified and robust cell-to-ICB interfacing and enable disclosed ICBs to be readily adapted and scaled to multiple weld strategies and electrical architectures. Depending on the intended application, an ICB assembly may interconnect the battery cells in series or in parallel and, if desired, may be integrated into a battery pack case or a battery module housing. Furthermore, disclosed ICB assemblies may integrate thereto any requisite electrical bussing, sensing, and interfacing hardware, including fuse, senseline, bypass, equalization, and communication devices, for example. Additional information regarding interconnect board assemblies for electrically interconnecting a group of battery cells may be found, for example, in commonly owned U.S. patent application Ser. No. 17/665,714, to Mitchell Stojanovski et al., and U.S. Pat. No. 11,302,996 B2, to Brittany A. Castillo et al., both of which are incorporated herein by reference in their respective entireties and for all purposes.

Figure 2:
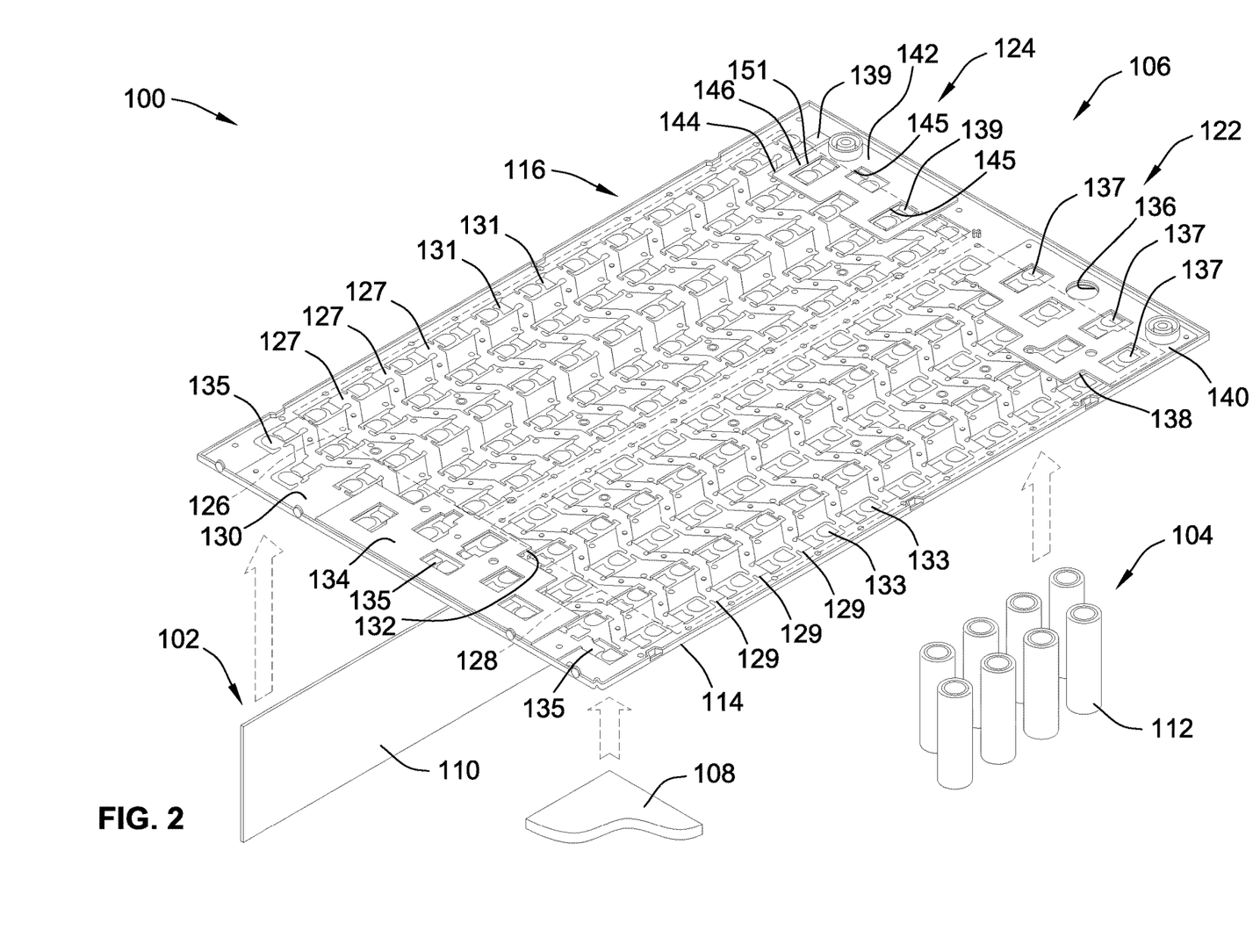
FIG. 2 is a partially exploded perspective-view illustration of select components of a representative battery module with a battery cell interconnect board (ICB) assembly including three multilayer current collector stacks for interconnecting a staggered cluster of lithium-class cylindrical battery cells in accord with aspects of the disclosed concepts.

With reference next to FIG. 2, there is shown a non-limiting example of a battery system with multilayer busbar end terminal ICB that is representative of aspects of the disclosed concepts. In particular, a battery module 100 is represented in FIG. 2 by a battery housing 102, a group of battery cells 104, and a battery cell interconnect board assembly 106. Although differing in appearance, it is envisioned that any of the features and options described above with reference to the RESS and traction battery pack 70 of FIG. 1 may be incorporated, singly or in any combination, into the battery module 100 of FIG. 2, and vice versa. As a non-limiting point of similarity, the battery module 100 stores a group of electrochemical battery cells 104 inside a protective, electrically insulating battery module housing 102, which may be a rigid, multi-part construction with a cell support tray (a fragment of which is shown at 108 in FIG. 2) that attaches to multiple elongated module sidewalls (one of which is shown at 110 in FIG. 2). While not per se limited, the battery cells 104 are shown as a staggered cluster of lithium-class cylindrical battery cells 112. It should be appreciated that the battery module 100 may take on different shapes, sizes, constituent parts, and materials, may be adapted to greater or fewer or different battery cells, any may be utilized for vehicular and non-vehicular applications.

For a vehicle RESS, the ICB assembly 106 may simultaneously function as a structurally reinforcing, electrically insulating, cell holding, sensing and bussing solution. In accord with the illustrated architecture of FIGS. 2-4, for example, the ICB assembly 106 is generally composed of an electrically insulative board frame 114, an electrically conductive multi-track busbar assembly 116 mounted onto the ICB board frame 114, and three multilayer busbar end terminal assemblies 120, 122 and 124 mounted to the ICB board frame 114 adjacent opposing ends of the busbar assembly 116. Optional ICB hardware may include a flexible integrated circuit (FIC) sensing package (not shown) with an assortment of battery operating sensors, such as voltage, current, and temperature sensing devices, and a senseline assembly (not shown) with electrical traces and pads for operatively connecting the FIC sensing package with select cells or cell groups of the module 100. The ICB assembly 106 may enable rapid and simplified alignment of the current collectors in the end terminal assemblies 120, 122, 124 for welding to the battery cells 104 while insulating adjacent current collector groups from above and below cells.

Figure 3:
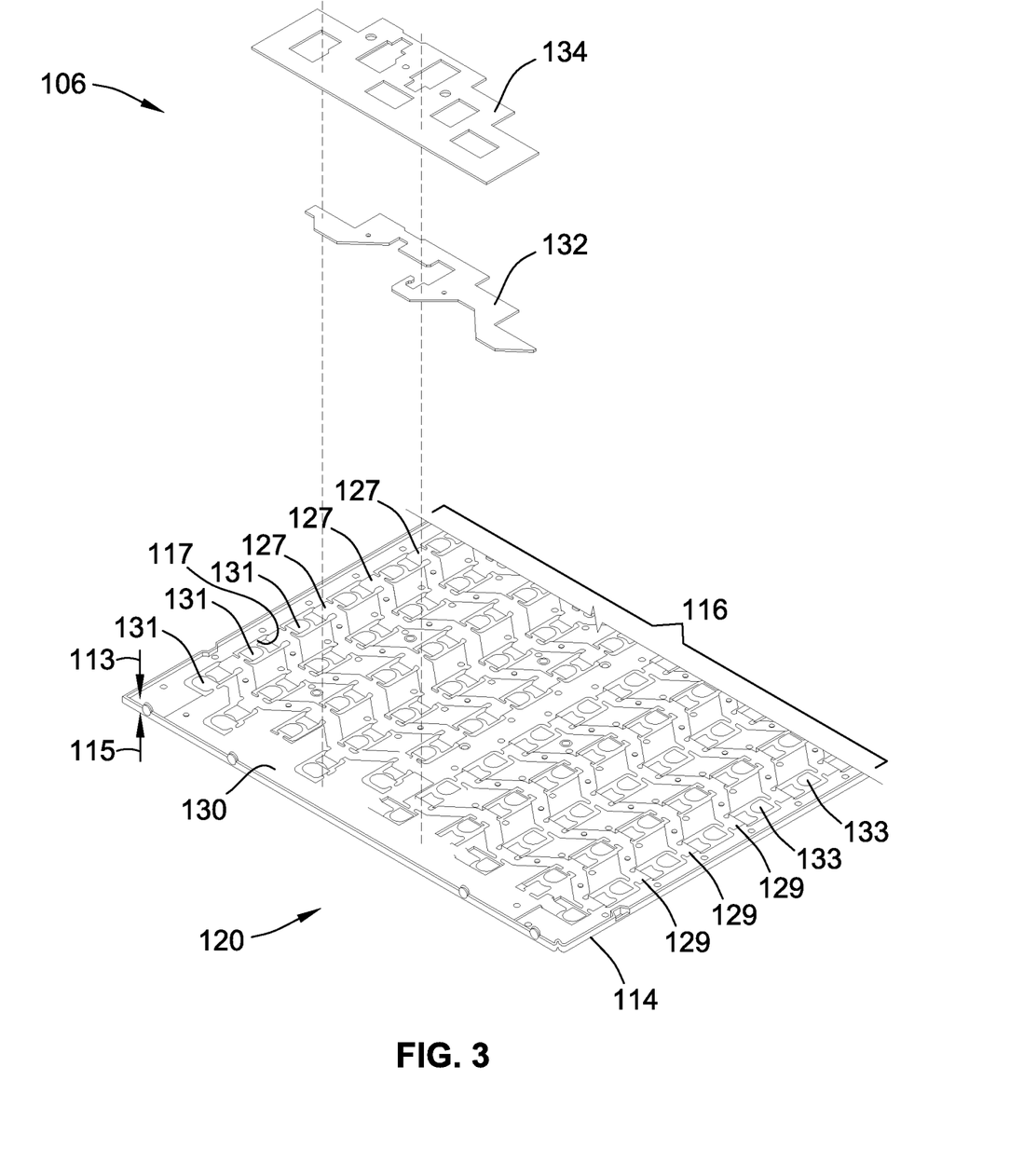
FIG. 3 is an enlarged perspective-view illustration of one end of the representative ICB assembly of FIG. 2 showing an exploded view of one of the multilayer current collector stacks.

While multipiece constructions are envisioned, it may be desired that the ICB board frame 114 be molded and machined as a one-piece planar panel using a rigid, electrically insulative material (e.g., polyvinyl chloride (PVC), fiber-reinforced polymer (FRP), synthetic resins, polyamides, etc.). The board frame 114 is shown in FIG. 2 fabricated with a rectangular polyhedron shape having opposing, mutually parallel top and bottom major faces 113 and 115 (FIG. 3). Extending through the board frame 114, from the top face 113 to the bottom face 115, is a staggered array of spaced-apart tab pockets 117. These tab pockets 117 may function as a structural locating feature (separately or in cooperation with heat stakes) for connecting the busbar assembly 116 and busbar end terminal assemblies 120, 122, 124 to the board frame 114. Recessed into the bottom face 115 of the board frame 114 is a staggered array of spaced-apart cell indentations 119 (FIG. 4), each of which seats therein a longitudinal end of a respective battery cell 104 for operatively aligning and physically retaining the cells 104 with the board frame 114. It should be appreciated that the number, arrangement, and shape/size of the tab pockets 117 and cell indentations 119 may be varied to accommodate any intended application. As used herein, the terms "planar" and "flat" may include 100% flat and substantially flat.

Busbar assembly 116 is generally composed of at least one electrically conductive busbar track that physically contacts and thereby electrically interconnects the cluster of battery cells 104. By way of example, and not limitation, the busbar assembly 116 of FIGS. 2-4 includes a left (first) busbar track 126 that transmits electrical current in a predefined (first) direction (e.g., right-to-left in FIG. 2) and is juxtaposed in spaced-relation with a right (second) busbar track 128 that transmits current in an opposite predefined (second) direction (e.g., left-to-right in FIG. 2). The left-side busbar track 126 is portrayed as a column of twelve (12) mutually parallel (first) busbar rails 127, and the right-side busbar track 128 is portrayed as a column of twelve (12) mutually parallel (second) busbar rails 129. For simplicity of design and manufacture, the busbar rails 127, 129 may be substantially structurally identical with one another, e.g., each stamped from a metallic material as a single-piece structure with a waveform plan-view profile. These busbar tracks 126, 128 are shown arranged in a U-shaped current flow configuration with the left busbar track 126 positioned parallel to the right busbar track 128, and the left busbar rails 127 arranged parallel to and staggered with the right busbar rails 129. It is envisioned that the busbar assembly 116 may comprise greater or fewer than two busbar tracks, each of which may contain any desired number of busbar rails with alternative designs and arranged in any suitable pattern. As used herein, the terms "parallel" and "mutually parallel" may include both 100% parallelism and substantially parallel.

Figure 4:
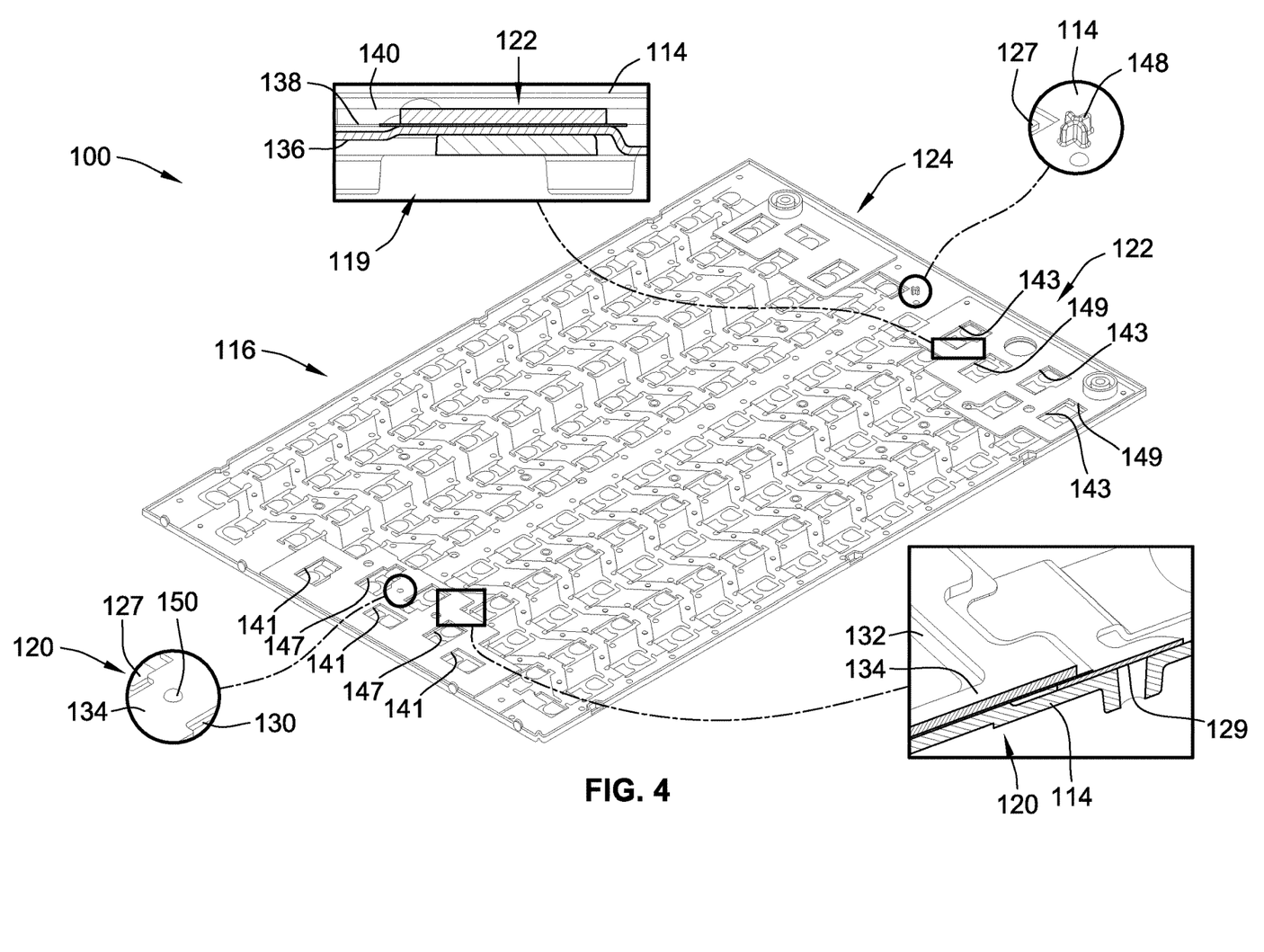
FIG. 4 is a perspective-view illustration of the representative ICB assembly of FIG. 2 with four enlarged inset views to better illustrate optional features of the representative ICB assembly.

Mounted adjacent a proximal (first) longitudinal end of the ICB board frame 114—stacked over a proximal (first) end of the busbar assembly 116—is a track-to-track connector (first) end terminal assembly 120 that transmits electrical current from the busbar's left track 126 to its right track 128. This end terminal assembly 120 includes a bottom (first) current collector layer 130, a central (first) dielectric layer 132, and a top (second) current collector layer 134. With this configuration, the bottom current collector layer 130 may be mounted directly to the ICB board frame 114 in neighboring spaced (non-contacting) relation to the two closest rails 127, 129 of the busbar tracks 126, 128. This bottommost current collector 130 electrically connects to the ten (10) closest battery cells 104 and, via this battery cell contact, electrically connects to the two busbar tracks 126, 128. Located next to the bottom current collector layer 130 is a central dielectric separator layer 132 that is physically interposed between the top current collector 134 and the busbar tracks 126, 128. The dielectric layer 132 physically separates and, thus, helps to electrically isolate the top current collector layer 134 from any subjacent segments of the busbar tracks 126, 128. Seated on top of the dielectric separator layer 132 is a top current collector layer 134 that is electrically connected (e.g., via welding) to the bottom current collector layer 130.

With continuing reference to FIG. 3, two intermodule-coupling cap end terminal assemblies 122, 124 are mounted proximate a distal (second) longitudinal end of the ICB board frame 114—stacked over a distal (second) end of the busbar assembly 116—and transmit electrical current to and from the busbar's left and right tracks 126, 128, respectively, and a mating battery module or an external load. In particular, a righthand-side (second) cap end terminal assembly 122 is mounted over a distal end of the right busbar track 128, spaced from the left busbar track 126, and includes a bottom (third) current collector layer 136, a central (second) dielectric layer 138, and atop (fourth) current collector layer 140. Similar to the current collector layer 130 of end terminal assembly 120, the bottom current collector layer 136 may be mounted directly to the ICB board frame 114 in neighboring spaced (non-contacting) relation to the closest rail 129 of the busbar track 128. The bottom current collector 136 electrically connects to the five (5) closest battery cells 104 and, via this battery cell contact, electrically connects to the right busbar track 128. Stacked on top of the current collector layer 136 is a central dielectric separator layer 138 that is physically interposed between the two current collectors 136, 140. Seated on top of the dielectric separator layer 138 is a top current collector layer 140 that is electrically connected (e.g., via welding) to the bottom current collector layer 136, sandwiching therebetween the dielectric layer 138. Dielectric layer 138 physically separates and, in so doing, helps to electrically isolate the top current collector layer 140 from any subjacent segments of the busbar track 128.

A lefthand-side (third) cap end terminal assembly 124 is mounted over a distal end of the left busbar track 126, spaced from the right busbar track 128, and includes a bottom (fifth) current collector layer 142, a central (third) dielectric layer 144, and a top (sixth) current collector layer 146. The bottom current collector layer 142 may be mounted directly to the top face 113 of the ICB board frame 114 in neighboring spaced (non-contacting) relation to the closest rail 127 of the busbar track 126. In addition, the bottom current collector 142 electrically connects to the five (5) closest battery cells 104 and, via this battery cell contact, electrically connects to the left busbar track 126. Stacked on top of the current collector layer 142 is a central dielectric separator layer 144 that is physically interposed between the two current collectors 142, 146. Seated on top of the dielectric layer 144 is a top current collector layer 146 that is electrically connected (e.g., via welding) to the bottom current collector layer 142, sandwiching therebetween the dielectric layer 144. The dielectric layer 144 physically separates and electrically isolates the top current collector layer 146 from any subjacent segments of the left busbar track 126. It should be appreciated that any reference to "first," "second," "third", etc., in the specification and claims is not used to show a serial or numerical limitation or to tie elements from the claims to elements in the specification and drawings. Moreover, the ICB assembly 106 may incorporate greater or fewer than three end terminal assemblies, each of which may contain greater or fewer than the three illustrated layers.

In accord with the illustrated example, each of the ICB end terminal assemblies 120, 122, 124 may be a discrete tripartite sandwich structure that consists essentially of the two electrically conductive current collectors and the electrically non-conductive dielectric separator stacked one on top of the other with the dielectric separator interposed between and physically contacting both of the current collectors. Each bottom current collector layer 130, 136, 142 may be formed, in whole or in part, from an electrically conductive material (e.g., copper, aluminum, nickel, etc.) as a distinct single-piece planar plate. In the same vein, the top current collector layers 134, 140, 146 may formed, in whole or in part, from an electrically conductive material (e.g., same as or similar to or distinct from bottom current collector) as a distinct single-piece planar plate. The dielectric layers 132, 138, 144 may each be formed, in whole or in part, from an electrically non-conductive material (e.g., polyamide, a polyester, a ceramic, etc.) as a one-piece planar sheet. By employing generally flat designs, the three layers may lie substantially flush against each other and thereby maintain a minimal vertical height.

For at least some implementations, all six of the current collector layers 130, 134, 136, 140, 142, 146 are structurally distinct (e.g., different shape, size, cutout arrangement, etc.) from their mated current collector and, as shown, from all other current collectors. As best seen in FIG. 3, for example, the three top current collector layers 134, 140, 146 each has its own distinctive plan-view geometry, width, length, total surface area, and cutout pattern. When looking at the partially exploded perspective view of FIG. 4, it can also be seen that the top current collector layer 134 has a different plan-view geometry, width, length, total surface area, and cutout pattern from the bottom current collector layer 130. All three of the dielectric layers 132, 138, 144 may be structurally distinct from their mated current collectors and, as shown, from all other dielectric layers.

To electrically connect the battery cells 104 with the ICB assembly 106, each of the busbar tracks 126, 128 is fabricated with multiple terminal-contacting track tabs 131 and 133, respectively, that project from opposing sides of the busbar rails 127, 129. These tabs 131, 133 contact and, if desired, are welded to the (positive and negative) electrical terminals of the cylindrical battery cells 112 when the ICB assembly 106 is seated on the battery cell cluster 104. To electrically connect the battery cells 104 with the busbar end terminal assemblies 120, 122 and 124, each of the bottom current collector layers 130, 136, 142 is fabricated with multiple terminal-contacting collector tabs 135, 137, 139 that project therefrom. These collector tabs 135, 137, 139 contact and, if desired, are welded to the electrical terminals of the battery cells 112. In a non-limiting example, each collector tab 135, 137, 139 is welded to a positive (or negative) cell terminal, and a mating counterpart track tab 131, 133 is welded to a negative (or positive) cell terminal. In this manner, the end terminal assemblies 120, 122, 124 electrically connect to the busbar track 126, 128.

To facilitate alignment and concomitant electrical coupling of the battery cells 104 with the ICB assembly 106, the bottom current collector layers 130, 136, 142 may be fabricated with a pattern of cutout segments 141, 143 and 145, respectively, that extend all the way through the current collector. Each cutout segment 141, 143 and 145 frames a respective one of the track tab 131, 133 and a respective collector tab 135, 137, 139 that is mated with that track tab 131, 133. Likewise, the top current collector layers 134, 140, 146 may be fabricated with a pattern of cutout segments 147, 149, 151 that extend all the way through the current collector. Each of these cutout segments 147, 149, 151 aligns with and exposes therethrough a respective cutout segment 141, 143 and 145 and the corresponding mated pair of track tab 131, 133 and collector tab 135, 137, 139 framed by that cutout segment 141, 143 and 145.

As shown in the enlarged inset view in the bottom lefthand corner of FIG. 4, each stacked end terminal assembly 120, 122, 124 may be rigidly attached to the board frame 114 using heat stakes 150 that pass through all layers of the assembly stack and into the frame. Alternative options for physically joining the busbar end terminal assemblies 120, 122, 124 to the ICB board frame 114 may include industrial adhesives, mechanical fasteners, snap fit joints, overmolding, etc. As yet a further option, the inset view in the upper righthand corner of FIG. 4 illustrates the ICB board frame 114 with a series of cruciform projections 148 that project vertically upwards and mate with complementary recesses in an ICB senseline assembly (not shown) for providing desired sensing capabilities (e.g., cell operating temperature and temperature variations to detect a possible thermal runway event). These projections 148 function as locating features to facilitate proper alignment and orientation of the senseline assembly when being mounted onto the ICB assembly 106. The bottom righthand inset view of FIG. 4 shows that the dielectric separator layer 132 may have a distinct shape and size than the bottom and/or top current collector layers 130, 134 to which it is mated. Additionally, a dielectric separator layer 132, 138 may be located between select subsegments of the top current collector layer 134, 140 and select subsegments of bottom current collector 130, 136. A dielectric separator layer 132, 138 may also be located between select subsegments of the top current collector layer 134, 140 and select subsegments of neighboring busbar rails 127, 129.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An interconnect board (ICB) assembly for a battery system with multiple battery cells, the ICB assembly comprising:
   an ICB board frame;
   a busbar assembly mounted to the ICB board frame and including an electrically conductive busbar track configured to electrically interconnect the battery cells, the busbar track including a first busbar track parallel to and spaced from a second busbar track, the first busbar track configured to contact a first set of the battery cells and the second busbar track configured to contact a second set of the battery cells, the first busbar track including a first set of mutually parallel busbar rails distinct and spaced from one another, the second busbar track including a second set of mutually parallel busbar rails distinct and spaced from one another, and the first set of mutually parallel busbar rails being staggered with the second set of mutually parallel busbar rails; and
   a first end terminal assembly mounted to the ICB board frame adjacent a first end of the busbar assembly, the first end terminal assembly extending transversely across and electrically connecting one end of the first busbar track to one end of the second busbar track, the first end terminal assembly including:
   a first current collector layer attached to the ICB board frame and configured to electrically connect to the battery cells and the busbar track;
   a first dielectric layer adjacent the first current collector layer; and
   a second current collector layer attached to the first dielectric layer, the second current collector layer electrically connected to the first current collector layer.

2. The ICB assembly of claim 1, wherein the first current collector layer includes multiple collector tabs projecting therefrom and configured to contact first electrical terminals of the battery cells and, via the contact with the battery cells, electrically connect to the busbar track.

3. The ICB assembly of claim 2, wherein the first current collector layer defines therethrough multiple first cutout segments each framing a respective one of the collector tabs.

4. The ICB assembly of claim 3, wherein the second current collector layer defines therethrough multiple second cutout segments each aligning with and exposing therethrough a respective one of the first cutout segments and the respective one of the collector tabs.

5. The ICB assembly of claim 4, wherein the busbar track includes multiple track tabs projecting from the first end of the busbar assembly and configured to contact second electrical terminals of the battery cells, each of the second cutout segments aligning with and exposing therethrough a respective one of the track tabs and a respective one of the collector tabs mating with the respective one of the track tabs.

6. The ICB assembly of claim 1, further comprising a second end terminal assembly mounted to the ICB board frame adjacent a second end of the busbar assembly, opposite the first end thereof, the second end terminal assembly being distinct and spaced from the first end terminal assembly, the second end terminal assembly including:
   a third current collector layer attached to the ICB board frame and configured to electrically connect to the battery cells and the busbar track;

a second dielectric layer adjacent the third current collector layer; and
a fourth current collector layer attached to the second dielectric layer, the fourth current collector layer electrically connected to the third current collector layer.

7. The ICB assembly of claim 6, wherein the first, second, third and fourth current collector layers are structurally distinct from one another.

8. The ICB assembly of claim 1, wherein the first end terminal assembly consists essentially of the first and second current collector layers and the first dielectric layer, and wherein the first dielectric layer is interposed between and physically contacting the second current collector layer and the busbar track.

9. The ICB assembly of claim 1, wherein the first current collector layer is formed with a first electrically conductive material as a first single-piece planar plate.

10. The ICB assembly of claim 9, wherein the second current collector layer is formed with a second electrically conductive material as a second single-piece planar plate.

11. The ICB assembly of claim 10, wherein the dielectric layer is formed with an electrically non-conductive material as a one-piece planar sheet.

12. The ICB assembly of claim 1, wherein the ICB board frame is formed with an electrically insulative material as a one-piece planar panel.

13. A motor vehicle, comprising:
a vehicle body;
a plurality of road wheels attached to the vehicle body;
a traction motor attached to the vehicle body and operable to drive one or more of the road wheels to thereby propel the motor vehicle; and
a traction battery pack attached to the vehicle body and electrically connected to the traction motor to transmit thereto electrical power, the traction battery pack including:
a cluster of cylindrical battery cells;
a housing case at least partially encasing the cylindrical battery cells; and
an interconnect board (ICB) assembly mounted to the housing case and including an electrically insulative ICB board frame, an electrically conductive busbar assembly mounted to the ICB board frame and including a pair of mutually parallel busbar tracks electrically interconnecting the cylindrical battery cells, and an end terminal assembly mounted to the ICB board frame adjacent a respective end of the busbar assembly, the end terminal assembly consisting essentially of:
a bottom current collector plate attached to the ICB board frame and spaced from the busbar assembly, the bottom current collector plate electrically connected to the battery cells and, via the battery cells, to the busbar track;
a dielectric separator sheet adjacent the bottom current collector plate and disposed over a select portion of the busbar track; and
a top current collector plate mounted on the dielectric separator sheet, the top current collector layer electrically connected to the bottom current collector plate,
wherein the busbar track includes first and second busbar tracks, the first busbar track being distinct from, parallel to, and spaced from the second busbar track, the first busbar track contacting a first set of the battery cells, the second busbar track contacting a second set of the battery cells, and the end terminal assembly extending transversely across and electrically connecting a first longitudinal end of the first busbar track to a second longitudinal end of the second busbar track, and
wherein the first busbar track includes a first set of mutually parallel busbar rails distinct and spaced from one another, the second busbar track includes a second set of mutually parallel busbar rails distinct and spaced from one another, and the first set of mutually parallel busbar rails is staggered with the second set of mutually parallel busbar rails.

14. A method of assembling an interconnect board (ICB) assembly for a battery system with multiple battery cells, the method comprising:
receiving an ICB board frame;
mounting a busbar assembly to the ICB board frame, the busbar assembly including an electrically conductive busbar track configured to electrically interconnect the battery cells, the busbar track including a first busbar track parallel to and spaced from a second busbar track, the first busbar track configured to contact a first set of the battery cells and the second busbar track configured to contact a second set of the battery cells, the first busbar track including a first set of mutually parallel busbar rails distinct and spaced from one another, the second busbar track including a second set of mutually parallel busbar rails distinct and spaced from one another, and the first set of mutually parallel busbar rails being staggered with the second set of mutually parallel busbar rails; and
mounting a first end terminal assembly to the ICB board frame adjacent a first end of the busbar assembly, the first end terminal assembly extending transversely across and electrically connecting the first busbar track to the second busbar track, the first end terminal assembly including:
a first current collector layer attached to the ICB board frame and configured to electrically connect to the battery cells and the busbar track;
a first dielectric layer adjacent the first current collector layer; and
a second current collector layer attached to the first dielectric layer, the second current collector layer electrically connected to the first current collector layer.

15. The method of claim 14, wherein the first current collector layer includes multiple collector tabs projecting therefrom and configured to contact first electrical terminals of the battery cells and, via the contact with the battery cells, electrically connect to the busbar track.

16. The method of claim 15, wherein the first current collector layer defines therethrough multiple first cutout segments each framing a respective one of the collector tabs.

17. The method of claim 16, wherein the second current collector layer defines therethrough multiple second cutout segments each aligning with and exposing therethrough a respective one of the first cutout segments and the respective one of the collector tabs.

18. The method of claim 14, further comprising mounting a second end terminal assembly to the ICB board frame adjacent a second end of the busbar assembly, opposite the first end thereof, the second end terminal assembly being distinct and spaced from the first end terminal assembly, the second end terminal assembly including:
a third current collector layer attached to the ICB board frame and configured to electrically connect to the battery cells and the busbar track;
a second dielectric layer attached to the third current collector layer; and a fourth current collector layer attached to the second dielectric layer, the fourth current collector layer electrically connected to the third current collector layer.

19. The method of claim 14, wherein:

the first current collector layer is formed with a first electrically conductive material as a first single-piece planar plate, the second current collector layer is formed with a second electrically conductive material as a second single-piece planar plate, and the dielectric layer is formed with an electrically non-conductive material as a one-piece planar sheet.

20. The method of claim 14, wherein the first end terminal assembly consists essentially of the first current collector layer, the second current collector layer, and the first dielectric layer, and wherein the first dielectric layer is interposed between and physically contacts the second current collector layer and the busbar track.

\* \* \* \* \*